(12) United States Patent
Shieh

(10) Patent No.: US 6,910,117 B2
(45) Date of Patent: Jun. 21, 2005

(54) METHOD FOR DETECTING LOGICAL ADDRESSES OF NONVOLATILE STORAGE MEDIUM

(75) Inventor: Sheng-Zhong Shieh, Hsinchu (TW)

(73) Assignee: Megawin Technology Co., Ltd., Hsinchu (TW)

( * ) Notice: Subject to any disclaimer, the term of this patent is extended or adjusted under 35 U.S.C. 154(b) by 200 days.

(21) Appl. No.: 10/414,041

(22) Filed: Apr. 16, 2003

(65) Prior Publication Data

US 2004/0210735 A1 Oct. 21, 2004

(51) Int. Cl.⁷ .............................................. G06F 12/00
(52) U.S. Cl. ........................................................ 711/206
(58) Field of Search ............................ 711/206, 3, 117, 711/118

(56) References Cited

U.S. PATENT DOCUMENTS 6,065,091 A * 5/2000 Green ............................. 711/3
2002/0091903 A1 * 7/2002 Mizuno ....................... 711/154
2004/0109376 A1 * 6/2004 Lin ......................... 365/230.03

* cited by examiner

Primary Examiner—Hiep T. Nguyen
(74) Attorney, Agent, or Firm—Rosenberg, Klein & Lee

(57) ABSTRACT

A method for detecting logical addresses of a nonvolatile storage medium is proposed, which defines the nonvolatile storage medium into several zones each comprising a plurality of blocks. Only an address mapping table of the first zone or a commonly used zone is built and stored in a RAM so that the system can quickly obtain logical addresses in the nonvolatile storage medium. Therefore, the effects of quick access speed and no occupied memory space can be accomplished. Moreover, the cost can be effectively lowered, and the performance of data access of the system can be enhanced.

7 Claims, 5 Drawing Sheets

| Physical block address | Block data | Logical address |
|---|---|---|
| 0 | block0 ( Data ) | 2 |
| 1 | block1 ( Data ) | 7 |
| 2 | block2 ( Data ) | 5 |
| 3 | block3 ( Data ) | 8 |
| 4 | block4 ( Data ) | 0 |
| 5 | block5 ( Data ) | 1 |
| 6 | block6 ( Data ) | 4 |
| 7 | block7 ( Data ) | none |
| 8 | block8 ( Data ) | 3 |
| ... | ... | ... |

METHOD FOR DETECTING LOGICAL ADDRESSES OF NONVOLATILE STORAGE MEDIUM

FIELD OF THE INVENTION

The present invention relates to a method for detecting logical addresses of a nonvolatile storage medium and, more particularly, to a method, which sets a nonvolatile storage medium into several zones, and only builds an address mapping table (AMT) or a look-up table of blocks in a commonly used zone to detect logical addresses with this AMT.

BACKGROUND OF THE INVENTION

Memories are locations for data storage. When a microprocessor utilizes a memory for storage and readout of data, it will define the position of memory with necessary information so as to transfer data to an accurate address.

A nonvolatile storage medium uses a block composed of a plurality of bytes as the unit for storage and readout of data. Each block for data access has a physical address to represent the space order in the nonvolatile storage medium. Simultaneously, each block records a logical address marked by the file system to let each physical address have a corresponding logical address, as shown in FIG. 1. However, in the mechanism of flash memory, because the correspondence relation between physical addresses and logical addresses required for data access of file system is not linear, logical address cannot be directly inferred from physical address.

Conventionally, there are usually two methods for obtaining a corresponding logical address. In the first method, an AMT (a table for recording the mapping relation between logical address and physical address) is first built when the system is booted, and a plurality of static random access memory (SRAM) are designed to record the AMT, as shown in FIG. 2. When building the AMT, the arrangement order of logical addresses is taken as the principal thing, and the corresponding physical addresses are filled into the table. Because the original logical addresses are irregularly arranged, it is necessary to sort from beginning to end once to build the AMT shown in FIG. 2. This AMT is stored in the SRAMs. When the system accesses data, it will first provide a logical address to be looked up and directly read out the AMT in the SRAMs using firmware, hence quickly obtaining the physical address corresponding to the logical address. Although this way of using the AMT to search logical address has the advantages of short address conversion time and quick processing speed, a large quantity of SRAMs are required for storing all address mapping relations, hence occupying a large space. Moreover, because it is necessary to simultaneously integrate different ICs into a single system chip, the number of SRAMs is fixed. The number of SRAMs cannot increase according to necessity, hence resulting in limit in use.

In the other method of inferring physical address from logical address, there is no SRAM, and it is not necessary to build any AMT. It is only necessary to utilize firmware to search from scratch in the nonvolatile storage medium until the required logical address is found when searching the logical address corresponding to a physical address each time. Because this way is designed without any SRAM, it occupies no space. However, because it is necessary to search the logical address from scratch each time, the search time is long, hence slowing down the speed of data access of nonvolatile storage medium.

Accordingly, the present invention aims to propose a method for detecting logical addresses of a nonvolatile storage medium to resolve the above problems in the prior art.

SUMMARY OF THE INVENTION

The primary object of the present invention is to provide a method for detecting logical addresses of a nonvolatile storage medium, wherein the zone is used as the unit and only an AMT of blocks in the first zone or a commonly used zone is built to accomplish the effects of quick access speed and less space occupied without adding any SRAM space. Therefore, the cost can be effectively lowered, and the performance of data access of the system can be enhanced.

Another object of the present invention is to write data of the same file attributes into the same zone when writing or refreshing data in the nonvolatile storage medium so as to concentrate data in the same zone, hence effectively enhancing the speed and stability of data access of the system.

According to the present invention, a nonvolatile storage medium is defined into several zones each comprising a plurality of blocks. When the system is booted, the relation between physical addresses and corresponding logical addresses of the first zone is built as a first AMT, which is stored in a random access address (RAM). Simultaneously, the threshold of an error function is set. When the system sends out a logical address to be looked up, the zone and block where the logical address locates is first calculated out, and whether the logical address is within the first zone is determined according to the calculated zone. If the answer is yes, i.e., the logical address to be looked up is stored in the first AMT, the RAM obtains a corresponding block physical address from the first AMT according to the logical address, and the error function is set to 0 simultaneously; otherwise, the system adds 1 to the error function. When the logical addresses successively calculated by the system for several times are not located in the first zone and the value of the error function reaches the threshold, the system will use the calculated zone as the unit to build the relation between the logical addresses to be looked up and corresponding zone addresses as a second AMT and store it into the RAM. The system can thus obtain the physical address corresponding to the logical address to be looked directly from the second AMT, and the error function is set to 0. Contrarily, if the value of the error function does not reach the threshold, the system will obtain the physical block address corresponding to the logical address directly from the calculated zone address and block address.

The various objects and advantages of the present invention will be more readily understood from the following detailed description when read in conjunction with the appended drawings, in which:

BRIEF DESCRIPTION OF THE DRAWINGS

FIG. 1 is a diagram showing the relation between physical addresses and logical addresses in a conventional memory;

Figure 2:
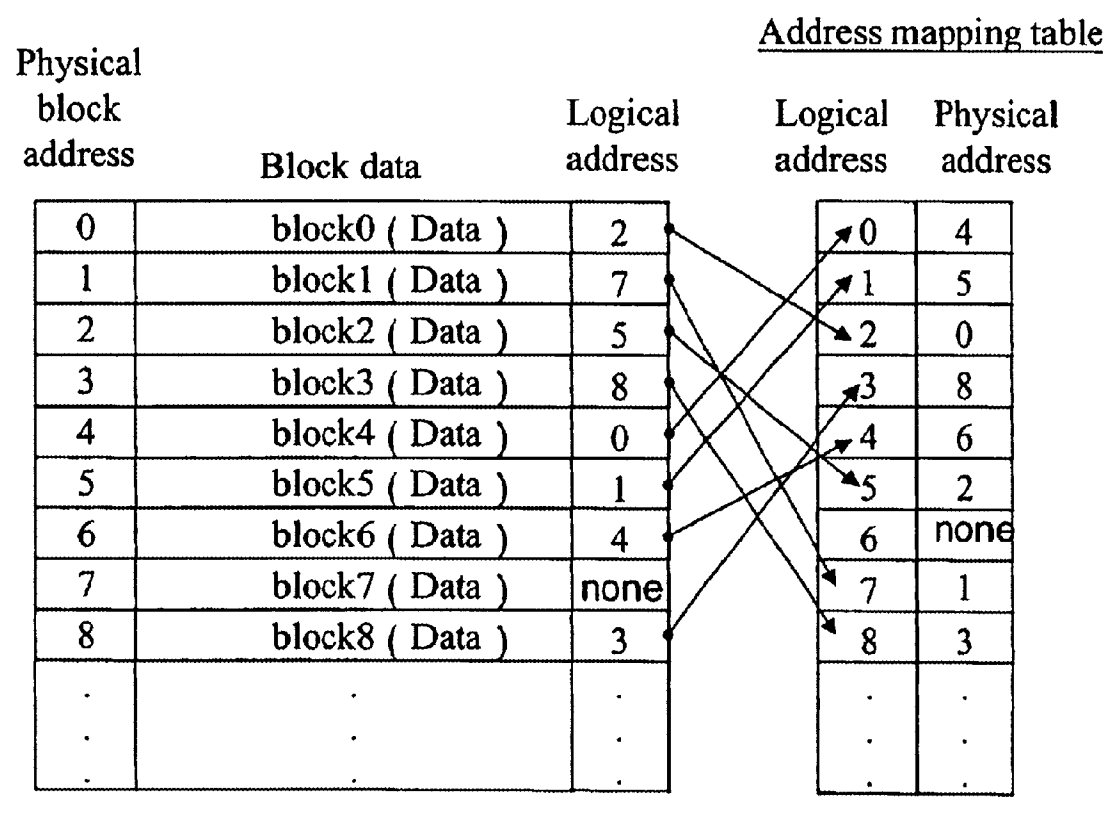

FIG. 2 is an address mapping table (AMT) built by means of the relation in FIG. 1;

DETAILED DESCRIPTION OF THE PREFERRED EMBODIMENTS

The present invention makes use of the characteristic that the system always reads out the system data region at the front end of a memory when booting and the characteristic that data storage is continuous to define a nonvolatile storage medium into several zones, each of which comprises a plurality of blocks. Only an address mapping table of a first zone or a commonly used zone is built and stored so that the system can quickly obtain physical addresses corresponding to logical addresses.

When the present invention detects the status of blocks in a nonvolatile storage medium, the method disclosed in the ROC patent application Ser. No. 92100483 "method for quickly detecting status of nonvolatile storage medium" is used, wherein the logical address of a block is recorded in a page (e.g., the first page) as a mark when writing in data. Therefore, when detecting the status of blocks in the nonvolatile storage medium, the first page of each block is directly read out to immediately know the status of blocks according to existence of the mark. The present invention cooperate with the above application to accomplish the function of quickly search physical addresses corresponding to logical addresses.

Figure 3:
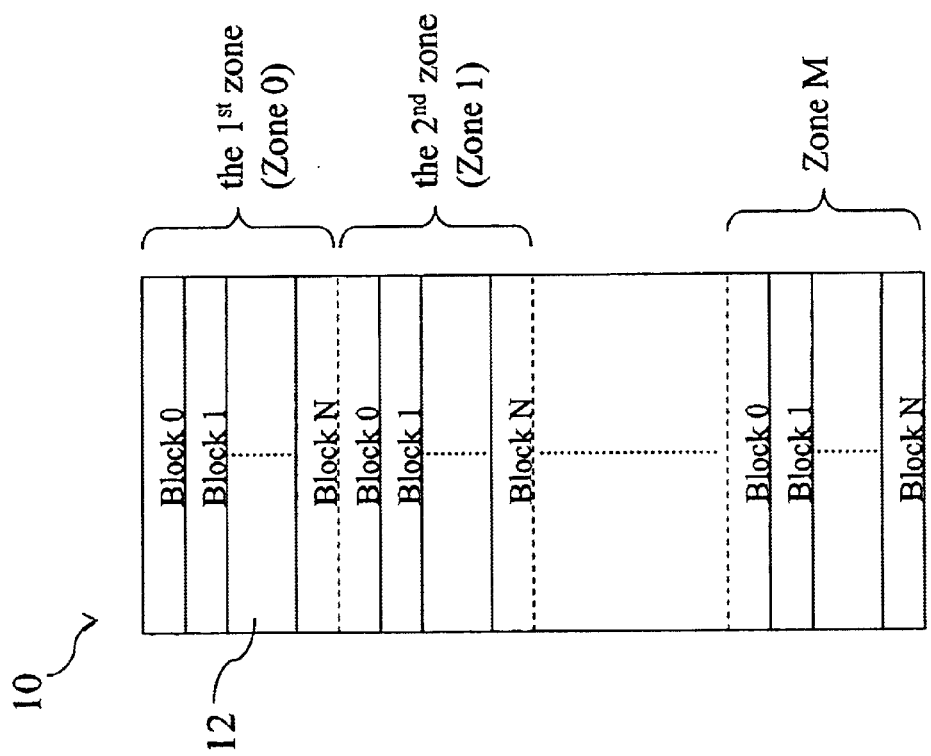
FIG. 3 is a diagram showing the relation between zone and block in a nonvolatile storage medium of the present invention.

As shown in FIG. 3, a nonvolatile storage medium 10 is defined into M zones, each of which comprises N blocks. The first zone is called Zone 0. Each block for data access has a physical address to represent the real position of physical memory in the memory. The physical address of each block has a corresponding logical address. Generally speaking, the boot data of system are stored at the front end of memory (usually called the system end) so that the system can always read out system boot data from this system end when booting. Based on this characteristic, the present invention sets the first zone 12 of the nonvolatile storage medium 10 as the system boot data region.

Figure 4:
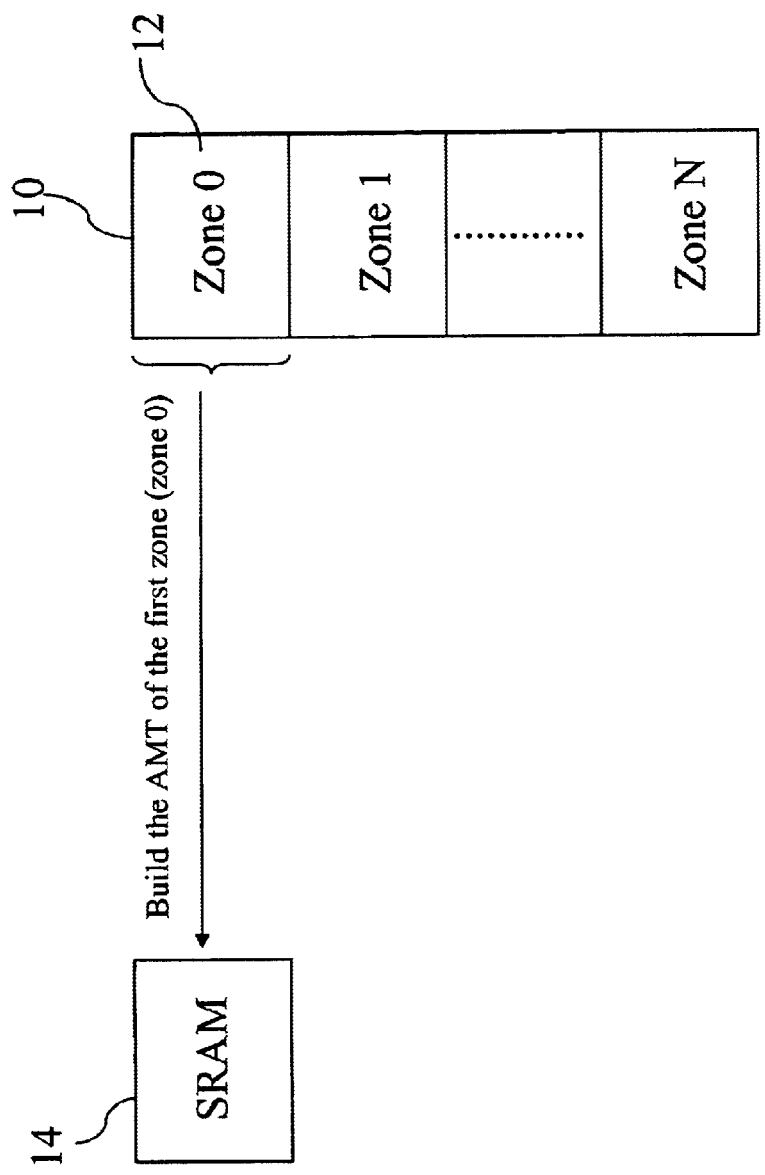
FIG. 4 is a diagram showing how to build a first AMT of the first zone.

As shown in FIG. 4, when the system is booted for initialization, the relation between physical addresses of blocks in the first zone 12 (Zone 0) of the nonvolatile storage medium 10 and corresponding logical addresses is built as a first address mapping table (AMT), which is a table taking the arrangement order of logical addresses as the principal thing and stored in a random access memory 14 which usually is a static random access memory (SRAM) so that the system can detect logical addresses to be looked up at any time. Besides, the threshold of an error function is set simultaneously. The threshold of the error function is between 5 to 10 and is preferred to be 10. Because only the AMT of blocks in the first zone is built, less storage space is occupied, hence reducing the number of SRAMs used. Moreover, when detecting logical address, it is only necessary to directly read out the AMT corresponding to the first zone. Because the number of physical addresses needed to be browsed is less, the readout speed can be hastened.

Figure 5:
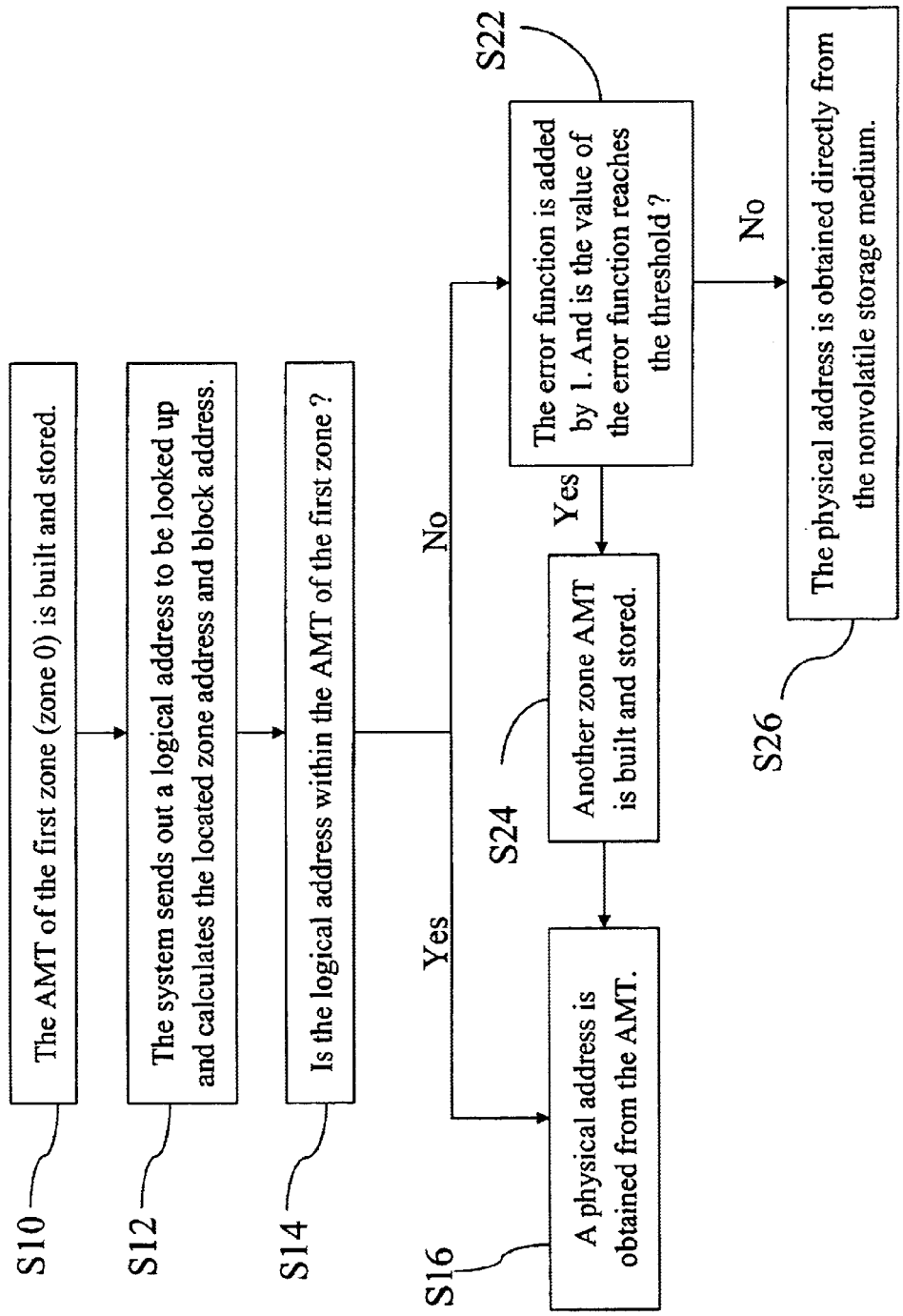
FIG. 5 is a flowchart of detecting logical addresses of the present invention.

FIG. 5 is a flowchart of detecting logical addresses of the present invention. First, as Step S10, the relation between physical addresses and corresponding logical addresses of blocks in the first zone is built as a first AMT and stored in a RAM when the system is booted.

When the system sends out a logical address to be looked up, as shown in Step S12, the zone and the block to which the logical address belongs are first calculated out. The calculation is accomplished by dividing the logical address by the number of blocks in a zone to obtain a quotient X and a remainder Y. This means that the logical address is situated at the Y-th block in the X-th zone. Then as shown in Step S14, the system determines whether the logical address to be looked up is within the first zone according to the calculated zone address. If the answer is yes, as shown in Step S16, representing the logical address to be looked up exists in the first AMT, the RAM will immediately obtain a corresponding physical address of block from the first AMT according to the logical address to be looked up, and the system will set the value of the error function to 0.

Contrarily, if the logical address to be looked up does not belong to the first zone after the system compares with the calculated address, the system will add 1 to the error function and as shown in Step S22, consecutively determine whether the value of the error function reaches the threshold (the threshold is set to 10 here). When the logical address detected by the system does not belong to the first zone for ten times consecutively, the value of the error function will reach the threshold of 10, representing the logical address to be looked up is fixed in a certain zone but not the first zone, as shown in Step S24, at this time, the system will build a second AMT with the calculated zone as a unit based on the relation between the logical addresses to be looked up and its corresponding zone addresses and store the table in the RAM to complement and refresh the AMTs in the RAM so that the system can obtain the physical address corresponding to the logical address to be looked up directly from the second AMT. Simultaneously, the system will set the error function to 0. Contrarily, if the value of the error function does not reach the threshold, as shown in Step S26, the system will obtain the physical block address corresponding to the logical address directly from the nonvolatile storage medium according to calculated zone address and block address. The Steps S12, S14, S16 or S22 to S26 are repeated until readout of data is finished.

The above is the flowchart for searching the logical address when the system is booted for initialization. On the other hand, when the system accesses file data in the nonvolatile storage medium 10 after finishing the boot operation, it will first build an AMT of the X-th zone in the RAM 14, and then proceeds as the above flowchart. After the system sends out a logical address to be looked up, the zone and block to which the logical address belongs are first calculated out. The system then determines whether the logical address to be looked up is within the X-th zone according to the calculated zone address. If the logical address to be looked up is stored in the X-th AMT, the RAM will immediately obtain a corresponding physical block address from the AMT of the X-th zone according to the logical address to be looked up, and the system will set the value of the error function to 0. Contrarily, if the logical address to be looked up is not in the X-th zone, the system will add 1 to the error function and consecutively determine whether the value of the error function reaches the threshold. When the value of the error function reaches the threshold of 10, representing the logical address to be looked up is fixed in a certain zone, the system will build an Y-th AMT with the zone as a unit based on the relation between the logical addresses to be looked up and corresponding zone addresses and store the table in the RAM 14 so that the system can obtain the physical address corresponding to the logical address to be looked up directly from the Y-th AMT. Simultaneously, the system will set the error function to 0. Contrarily, if the value of the error function does not reach the threshold, the system will obtain the physical block address corresponding to the logical address to be looked up directly from the calculated zone and block position of the nonvolatile storage medium 10.

Besides, when writing or refreshing data in the nonvolatile storage medium 10, data of the same file attributes are written into the same zone. Therefore, data can be concentrated in the same zone to enhance the performance of data access of the system.

To sum up, the present invention makes use of the characteristics that the system always reads out the system data region at the front end of a memory when booting and that data storage is continuous, and cooperates with the above-mentioned method of utilizing marks to quickly detect the status of a nonvolatile storage medium to only build an AMT of the first zone or a commonly used zone with the zone as a unit, hence occupying less RAM. Moreover, because it is only necessary to search AMTs of those commonly used zones when searching logical addresses, the number of physical addresses to be searched is less, hence having a higher processing speed as compared to the prior art. Therefore, the effects of quick access speed and no space occupied can be accomplished. Moreover, the cost can be effectively lowered, and the performance of data access of the system can be enhanced.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A method for detecting logical addresses of a nonvolatile storage medium comprising the steps of:

defining several zones each having a plurality of blocks in said nonvolatile storage medium, building a first address mapping table according to the relation between physical addresses of a first zone and corresponding logical addresses, storing said address mapping table in a random access memory, simultaneously setting the threshold of an error function;

calculating out the zone address and block address to which a logical address belongs when the system sends out said logical address to be looked up, the system then determining whether said logical address to be looked up is within said first zone according to the calculated zone address, said random access memory immediately obtaining a corresponding physical block address from said first address mapping table according to said logical address to be looked up and the system setting the value of said error function to 0 if the answer is yes, representing said logical address to be looked up exists in said first address mapping table;

the system adding 1 to the value of said error function if the answer is no, the system building a second address mapping table with the calculated zone as a unit based on the relation between said logical address to be looked up and another corresponding zone address and storing said second address mapping table in said random access memory to let the system obtain the physical address corresponding to said logical address to be looked up directly from said second address mapping table when the logical address consecutively calculated by the system is not in said first zone so that the value of said error function reaches said threshold; and the system obtaining the physical block address corresponding to said logical address to be looked up directly from said nonvolatile storage medium according to the calculated zone address and block address if the value of said error function does not reach the threshold.

2. The method for detecting logical addresses of a nonvolatile storage medium as claimed in claim 1, wherein after the system sends out a logical address to be looked up, the zone and block to which said logical address belongs are first calculated out, the system then determines whether said logical address to be looked up is within an address mapping table of the X-th zone according to the calculated zone address, said random access memory will immediately obtain a corresponding physical block address from said address mapping table of said X-th zone according to said logical address to be looked up and the system will set the value of said error function to 0 if said logical address to be looked up is stored in said address mapping table of said X-th zone, if said logical address to be looked up is not in said X-th zone, the system will add 1 to the value of said error function, when the value of said error function reaches said threshold, the system will build an address mapping table of the Y-th zone with the calculated zone as a unit based on the relation between said logical address to be looked up and the corresponding physical zone address and store said table in said random access memory so that the system can obtain the physical address of said logical address to be looked up directly from said address mapping table of said Y-th zone, the system will simultaneously set the value of said error function to 0, contrarily, if the value of said error function does not reach said threshold, the system will obtain the physical block address corresponding to said logical address to be looked up directly from the calculated zone and block in said nonvolatile storage medium.

3. The method for detecting logical addresses of a nonvolatile storage medium as claimed in claim 1, wherein said first zone is a system boot data region.

4. The method for detecting logical addresses of a nonvolatile storage medium as claimed in claim 1, wherein the method for calculating the zone address and block address to which said logical address belongs is accomplished by dividing said logical address by the number of blocks in a zone to obtain a quotient X and a remainder Y, representing said logical address is located at the Y-th block of the X-th zone.

5. The method for detecting logical addresses of a nonvolatile storage medium as claimed in claim 1, wherein said threshold of said error function is between 5 to 10.

6. The method for detecting logical addresses of a nonvolatile storage medium as claimed in claim 1, wherein said random access memory is a static random access memory.

7. The method for detecting logical addresses of a nonvolatile storage medium as claimed in claim 1, wherein data of the same file attribute are written into the same zone when writing or refreshing data in said nonvolatile storage medium.

* * * * *